(12) United States Patent
Fredriksson (10) Patent No.: US 7,269,937 B2
(45) Date of Patent: Sep. 18, 2007

(54) CHAIN SHORTENING DEVICE (75) Inventor: Lars Fredriksson, Akersberga (SE)

(73) Assignee: Frenolink Forvaltnings AB (SE)

(*) Notice: Subject to any disclaimer, the term of this patent is extended or adjusted under 35 U.S.C. 154(b) by 58 days.

(21) Appl. No.: 10/551,329

(22) PCT Filed: Feb. 25, 2004

(86) PCT No.: PCT/SE2004/000255

§ 371 (c)(1),
(2), (4) Date: Sep. 29, 2005

(87) PCT Pub. No.: WO2004/087553

PCT Pub. Date: Oct. 14, 2004

(65) Prior Publication Data

US 2006/0213177 A1   Sep. 28, 2006

(30) Foreign Application Priority Data

Mar. 31, 2003   (SE) .................. 0300914

(51) Int. Cl.
F16G 15/04   (2006.01)
(52) U.S. Cl. .............. 59/93; 59/85; 24/116 R; 294/82.1
(58) Field of Classification Search ............ 59/85, 59/86, 93; 24/116 R; 294/82
See application file for complete search history.

(56) References Cited

U.S. PATENT DOCUMENTS

| 2,165,377 | A | * | 7/1939 | Henry | ............ 24/116 R |
| 3,027,615 | A | * | 4/1962 | Forney | ............ 24/116 R |
| 3,545,200 | A | * | 12/1970 | Fagan | ............ 59/93 |
| 3,729,926 | A | * | 5/1973 | Buske | ............ 59/93 |
| 4,247,966 | A | * | 2/1981 | Labbe | ............ 24/116 R |
| 5,724,804 | A | * | 3/1998 | Smetz | ............ 59/93 |
| 5,732,545 | A | | 3/1998 | Fredriksson | |
| 6,568,165 | B2 | * | 5/2003 | Smetz | ............ 59/93 |
| 6,874,206 | B2 | * | 4/2005 | Smetz | ............ 24/116 R |

FOREIGN PATENT DOCUMENTS

| DE | 39 22 304 A1 | | 2/1990 |
| DE | 42 39 482 A1 | | 5/1994 |
| DE | 4239482 | * | 5/1994 |
| GB | 2 127 129 A | | 4/1984 |
| GB | 2221742 | * | 2/1990 |
| WO | PCT94/25777 | * | 11/1994 |
| WO | WO 02/21014 A1 | | 3/2002 |

* cited by examiner

Primary Examiner—David B Jones
(74) Attorney, Agent, or Firm—Akerman Senterfitt (57) ABSTRACT A chain shortening device is described. The device has the general shape of the letter "C". A single slot (20) extends longitudinally along the elongated body (10) of the device. The single slot has a central widened portion defining a lead-through opening (20E) through which a loop of an associated chain can be inserted, whereby the device can be handled as a separate unit and be attached sideways to an associated chain.

10 Claims, 9 Drawing Sheets

CHAIN SHORTENING DEVICE

FIELD OF THE INVENTION

The present invention relates to a chain shortening device for use in connection with associated chains having oblong steel links, the device being of the kind defined in the preamble of claim 1.

BACKGROUND OF THE INVENTION AND PRIOR ART

There are many known chain shortening devices of similar kinds and designed to couple two strands (or end portions) of chains together or to shorten a single strand of a chain. Such coupling or shortening is often desirable for connecting or securing an object to another object or to a fixed support of some kind, or for lifting an object by means of a lifting device, such as crane, provided with a lifting means, such as a lifting hook or a coupling link, e.g. a master link.

Normally, such a lifting means is connected to two or more chain portions which are coupled to an object to be lifted. Then, it is important to shorten at least one of the chain portions, so that the object is properly balanced during the lifting operation.

A chain shortening device of the kind referred to in the first paragraph, and which is designed to enable adjustment of the effective length of a chain portion, is known from the patent specification DE 42 39 482 C2 (Rud-Kettenfabrik). This known device comprises a longitudinal body having the general shape of the letter "C" and having, at its arcuate end portions, two pocket-like configurations which merge with an associated slot portion ending in a widened portion forming an aperture. Thus, there are two such apertures, located on each side of a transversal web joining two parallel side portions of the elongated body and serving to permit threading through chain links of a chain coupled to the shortening device so as to adjust the effective length of the associated chain by positioning selected links in each of the pocket-like configurations. The chain portion between these two such selected links may either form a slack chain portion of desired length or a straight chain portion extending at a small distance sideways from the central, normally vertically oriented body part provided with the transversal web. In this way, the effective length of the chain portion can be adjusted at will.

However, the structure is such, in particular at the central part of the C-shaped body provided with two different apertures separated by the transversal web, that the chain portion is trapped in the shortening device (the C-chaped body). In the German patent specification, it is clearly stated that this is an intentional feature ("unverlierbar" approximately meaning "not detachable"), so that the device will not come apart from the chain and get lost.

OBJECT OF THE INVENTION

The object of the present invention is to provide a shortening device of the kind referred to above, which permits a convenient adjustment of the effective length of a chain portion but which can be handled separately from the chain. In particular, it should be possible to use the shortening device as a separate unit and couple it to a chain portion which is already connected at its ends, e.g. to a lifting means and to an object, respectively.

A further object of the invention is to provide such a separate shortening device, which can be attached sideways to a chain portion so as to be coupled thereto in a safe way with two selected chain links positioned in each of the pocket-like configurations.

Another object is to enable an easy adjustment of the effective length of a chain portion coupled to the device, so that the adjustment can be effected conveniently by one person by using his two hands. This should be possible irrespective of the orientation of the device and the chain portion, whether oriented vertically or some other direction.

SUMMARY OF THE INVENTION

These objects are met for a chain shortening device having the features defined in claim 1. Thus, the slot portions of the chain shortening device according to the present invention form parts of a central, single slot extending continuously and longitudinally between the first and second pocket-like configurations, and this central, single slot has a widened mid portion forming a central lead-through opening, which includes said two apertures and which is dimensioned to permit threading through a loop of said associated chain with two parallel strands. In this way, the shortening device can be handled as a separate unit and be attached sideways to an existing associated chain for the purpose of shortening the effective length thereof. Also, it is easy to adjust the effective length by moving one of the selected links from the associated pocket-like configuration of the shortening device to the central lead-through opening and placing another link into position in the central lead-through opening, whereupon this other link can be displaced into the pocket-like configuration, where it is safely coupled to the shortening device.

Preferably, the central lead-through opening is elongated in the longitudinal direction of the elongated body. The width of the slot portions adjacent to the central lead-through opening should be only slightly wider than said material thickness d of the links of the associated chain, such as to prevent coupling to a chain consisting of links being stronger than those of the associated chain, and the length of the central lead-through opening should be such as to permit threading through a loop of an associated chain with the links of the two parallel strands of the loop being positioned next to each other in the longitudinal direction of the elongated body of the shortening devices.

Most preferably, the central lead-through opening should be wider than the outer width of the links of the associated chain and longer than 1,5 times that width.

In a modified embodiment according to the invention, the central lead-through opening has, at the mid portion of the elongated body, a waist portion with a reduced width so as to permit threading through a central part of an upright link forming the leading end of a loop through said waist portion and threading through the adjoining parallel strands through wider apertures on each side of said waist portion.

Additional advantageous features will appear from the detailed description below, and some of these features are defined in the dependent claims appended to this description.

Accordingly, the invention will be explained more fully below with reference to the drawings illustrating some preferred embodiments of the invention.

Figure 1A:
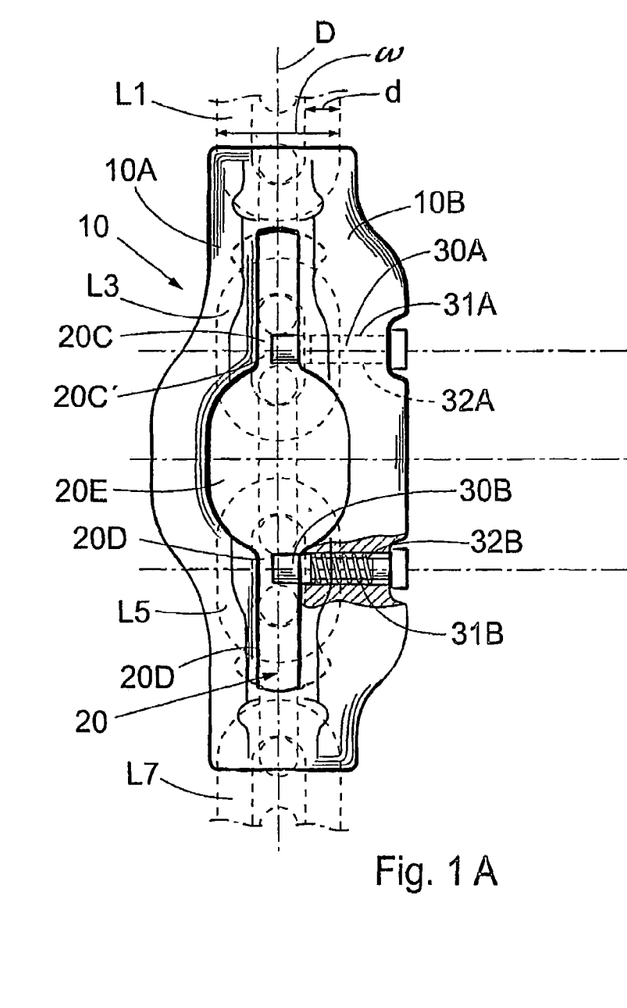
FIGS. 1A and 1B show a first embodiment of a shortening device of the invention and, in dashed lines, a portion of an associated chain, in a rear view (from the left in FIG. 1B) and a central sectional view, respectively.
Figure 1B:
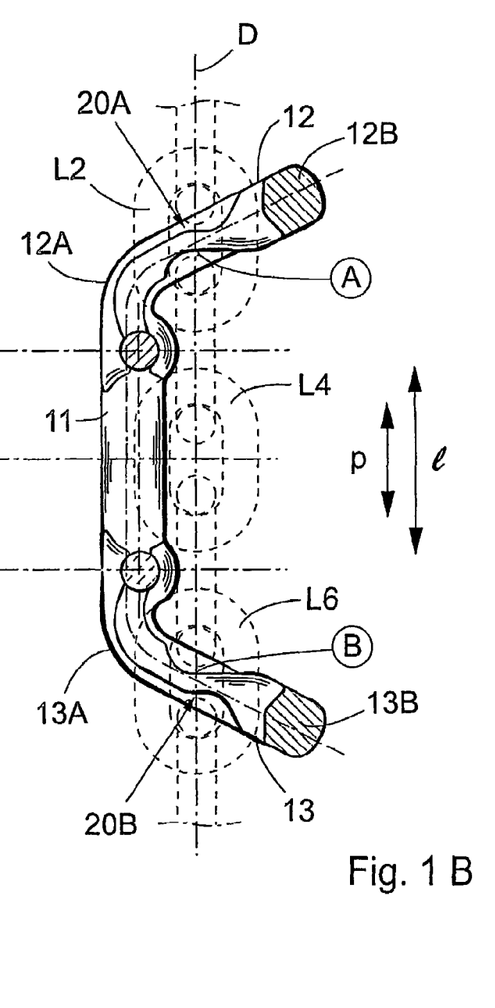

The first embodiment of the shortening device, shown in FIGS. 1A and 1B, comprises a unitary body 10 of forged steel. The elongated body 10 is elongated in a longitudinal direction D, which also forms the central longitudinal axis of an associated chain being coupled to the body 10. The elongated body 10 has the general shape of the letter "C", as seen in the sectional view of FIG. 1B, including a vertically extending mid portion 11, an upper or first end portion 12 and a lower or second end portion 13 ("upper" and "lower" is only related to the position as shown in the drawings and not necessarily in use of the device). Each of the end portions 12 and 13 has an arcuate or bent portion 12A, 13A forming the transition between the straight mid portion 11 and the likewise straight portions near the respective free ends of the body 10. These arcuate or bent portions 12A,13A could alternatively be formed at the upper and lower portions of the mid portion 11. In the shown embodiments, the end portions 12,13 are directed obliquely upwardly and downwardly respectively, so as to diverge from each other and form a wide space therebetween. This wide space is useful when handling the chain portion located between these end portions.

As will be apparent from FIG. 1A, the body 10 is longitudinally divided into two parallel side parts 10A and 10B extending at a respective side of the longitudinal axis D and being mutually connected to each other at each end 12B and 13B, respectively (FIG. 1B). The two side parts 10A and 10B form between themselves a central, single slot 20 extending longitudinally and continuously from the upper or first end 12B to the lower or second end 13B of the body 10.

Adjacent to the upper or first end 12B, the side parts 10A and 10B on each side of the slot 20 form a pocket-like configuration 20A with seating surfaces curved and dimensioned so as to support a selected link L2 and its adjoining links L1 and L3 of an associated chain coupled to the shortening device. The links L1-L5 of the associated chain are oblong having an outer length l and an inner length p, an outer width w and a material thickness or diameter d.

The side parts 10A and 10B, adjacent to the lower end 13B, form a corresponding lower or second pocket-like configuration 20B for a selected link 16 and its adjoining links L5 and L7. In FIGS. 1A and 1B, the links L2 and L6 are selected to be positioned in first and second coupling positions in the first and second pocket-like positions, respectively, and the links L3, L4, L5 located therebetween form a straight line along the longitudinal axis D. As will be described below, it is possible to adjust the mutual coupling between the device and the associated chain, so that a slack chain portion will instead be arranged between the two pocket-like configurations 20A,20B (see FIG. 6).

The single central, longitudinally extending slot 20 includes first and second (upper and lower in the drawings) slot portions 20C and 20D extending from the respective pocket-like configuration to a central, widened opening 20E. The first and second slot portions 20C, 20D have a width which is only slightly wider than the material width w of the chain links so as to give a convenient clearance when displacing a chain link along the slot portion while being oriented with its central plane located centrally in the slot through the longitudinal axis D.

Figure 5:
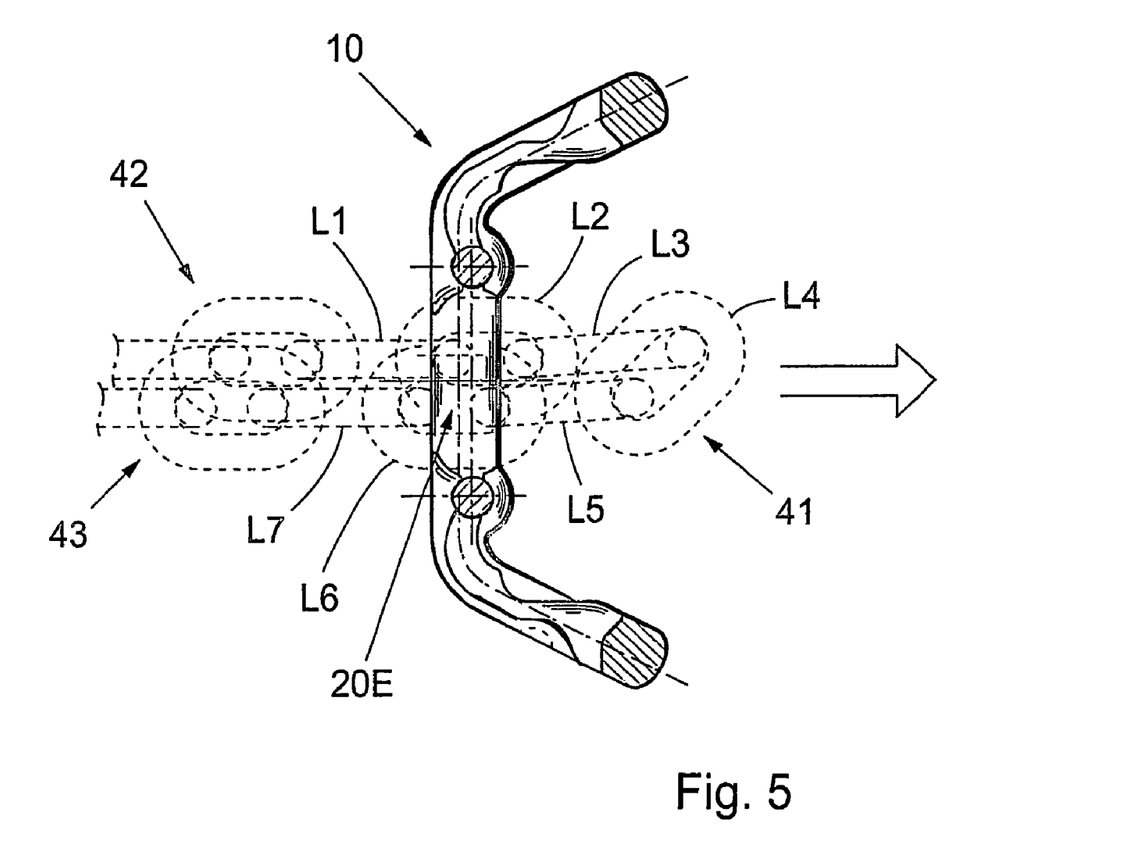
FIG. 5 shows, in a sectional view, how a loop of an associated chain can be threaded through the first embodiment of the shortening device.

Each slot portion 20C,20D merges with the central opening 20E via a slightly diverging mouth portion 20C', 20D'. The central opening 20E is elongated in the longitudinal direction D. In the preferred embodiment as shown, the width of the opening 20E is slightly wider than the width w of the chain links and the length of the opening 20E is longer than this width w. Preferably, its length is between 1.5 and twice this width w. Hereby, a loop of the chain can be threaded through the opening 20E as illustrated in FIG. 5.

The side parts 10A and 10B of the elongated body 10 are provided with curved recesses adjacent to the central slot 20, as is previously known per se in similar devices, so that the links adjoining a link in the slot are accommodated with their curved end portions in these recesses while being displaced along the respective slot portion to the first and second pocket-like configurations 20A and 20B, respectively.

In the vicinity of each mouth portion 20C',20D' of the slot 20, the elongated body 10 is provided with retaining members in the form of transverse pins 30A and 30B, which are guided in associated transverse bores 31A and 31B, respectively, in the side part 10b of the elongated body 10. The pins 30A and 30B are movable between a locking position, as shown, and a retracted position (not shown) against a helical spring member 32A and 32B, respectively. The retaining members 30A, 30B serve to retain a selected chain link L2, L6 in each slot portion 20C, 20D, so that the chain remains coupled to the shortening device.

Figure 8:
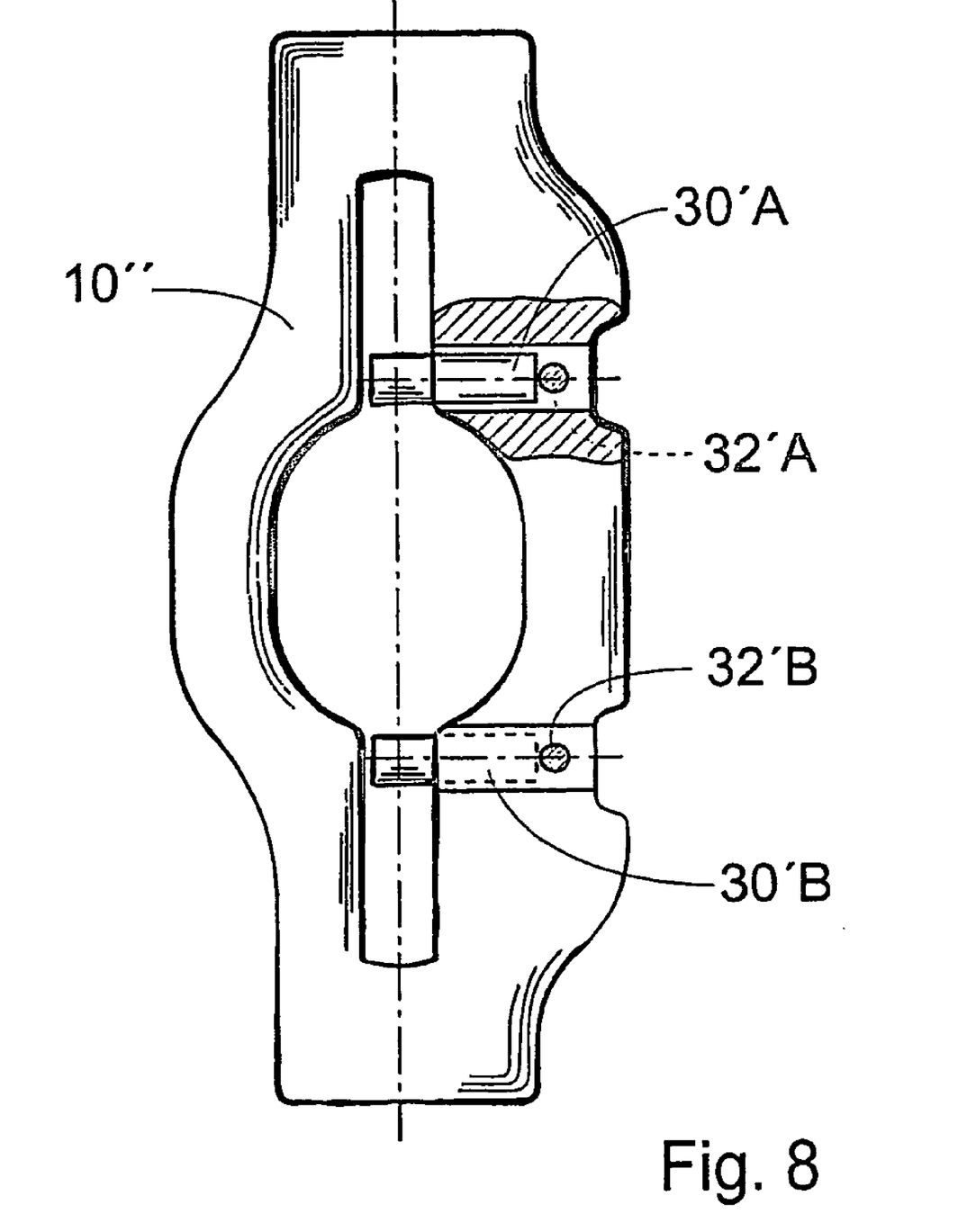
FIG. 8 shows, in a view corresponding to FIG. 1A, a modified version of the first embodiment with alternative retainer members.

An alternative embodiment of such retaining members is shown in FIG. 8. Here, the elongated body 10" corresponds essentially to the embodiment of FIGS. 1A and 1B. The transverse retainer pins 30'A and 30'B are not spring-loaded but are held in retaining positions by means of locking pins 32'A and 32'B. These locking pins 32'A and 32'B are inserted into associated bores (perpendicularly to the retaining pins) and are secured e.g. by friction, threads or conical clamping.

Figure 3A:
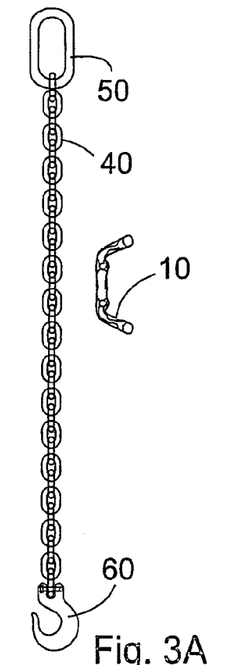
FIGS. 3A, 3B, 3C, 3D, 3E, and 3F illustrate, in schematic side views, how the shortening device can be used together with an associate chain provided with coupling and hook means at its ends.
Figure 7:
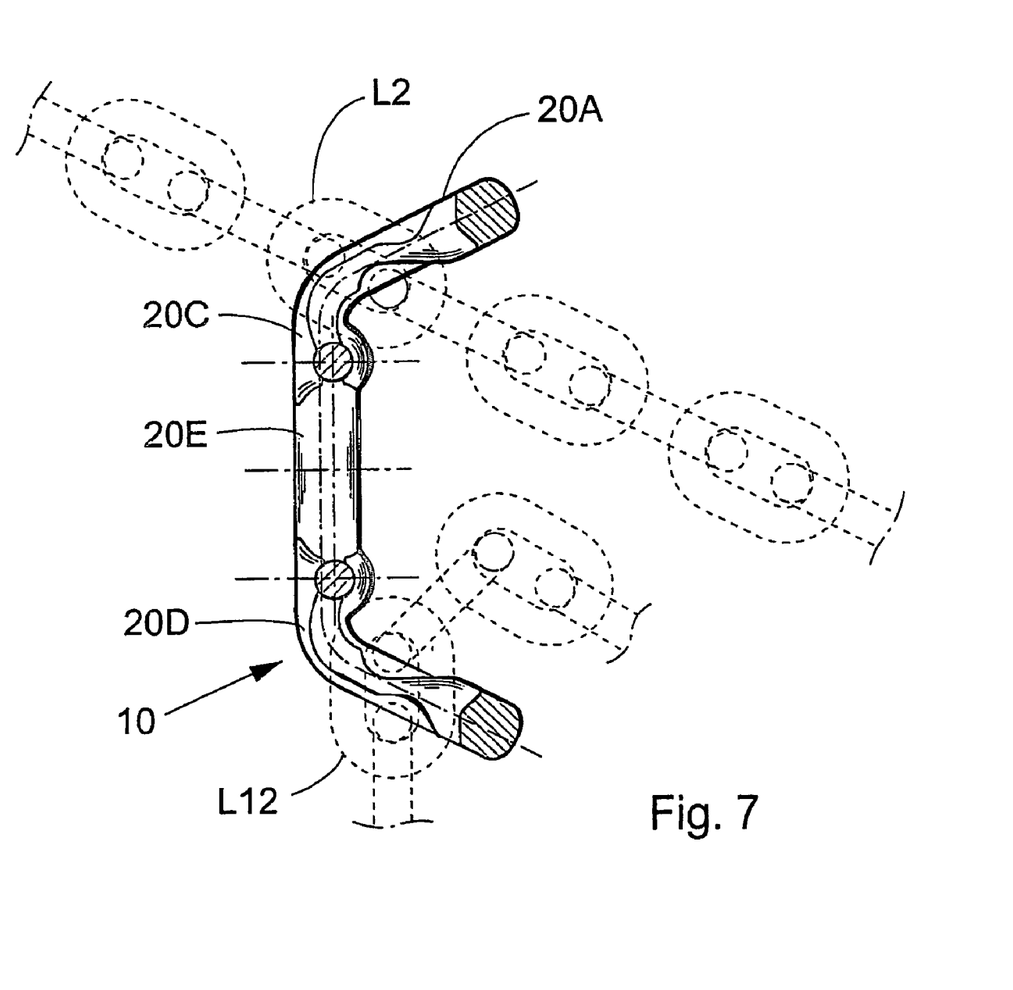
FIG. 7 illustrates, likewise in a sectional view, an operation serving to adjust the effective length of the associated chain coupled to the first embodiment of the shortening device.

However, the main purpose and advantage with the shortening device of the present invention is to permit attachment of the shortening device, being a separate unit 10, to a chain unit 40 (FIG. 3A) which is connected at its ends to a respective connecting means, such as a master link 50 and a hook 60. The shortening device can thus be positioned at any convenient location between the ends of the chain, whereupon a loop 41 of the chain 40, with two parallel strands 42,43 (see FIG. 3B and FIG. 5), is drawn through the central opening 20E. A selected link L2 is brought into the upper or first slot portion 20C (FIG. 7) and is positioned in the upper or first pocket-like configuration 20A of the body 10.

Figure 6:
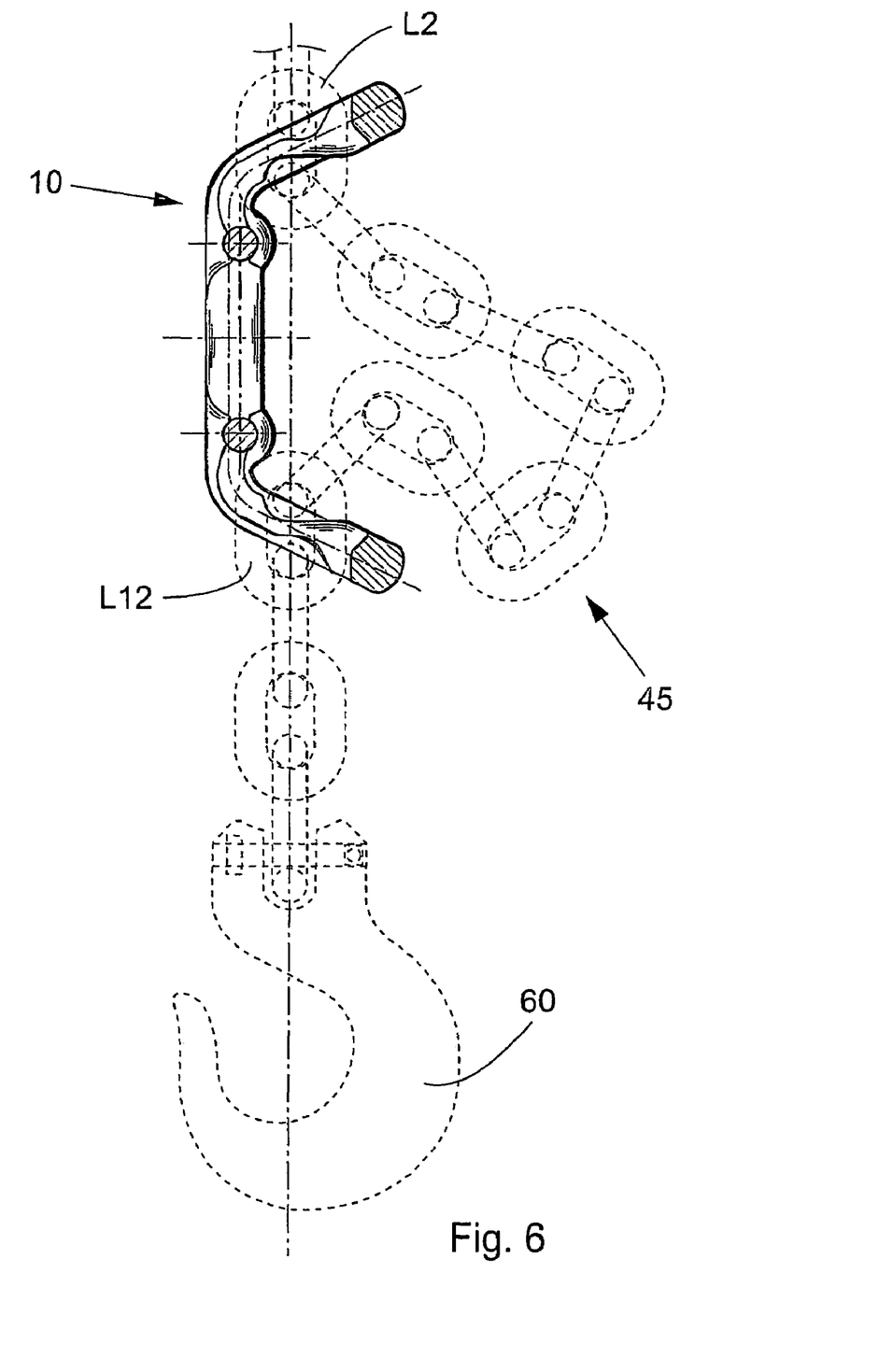
FIG. 6 shows, likewise in a sectional view, the first embodiment of the shortening device being coupled to the associated chain so as to shorten the effective length of the latter.

Thereupon, the operator grabs the chain links on each side of the shortening body 10 with his (or her) hands LH, RH (FIG. 3C) and pulls through the chain loop through the central opening 20E (FIG. 7) until a selected link L12 is positioned in alignment with the lower or second slot portion 20D. This lower selected link L12 is then manually displaced through the slot portion 20D all the way down to the lower or second pocket-like configuration 20B. The final, coupled position of the chain 40 with a slack chain portion 45 is shown in FIGS. 3D and 6. In this position, the retainer pins 30A, 30B (FIG. 1A) are inserted into their locking positions to secure a safe coupling of the shortening device 10 to the chain unit 40. Of course, the length of the slack chain portion 45 can be chosen at will so that the effective length of the chain unit 40 obtains a desired length.

The orientation of the chain unit 40 is not important. In FIG. 3F, the assembly of FIG. 3D is shown upside down with the hook 60 at the top and the master link 50 at the bottom.

Figure 3B:
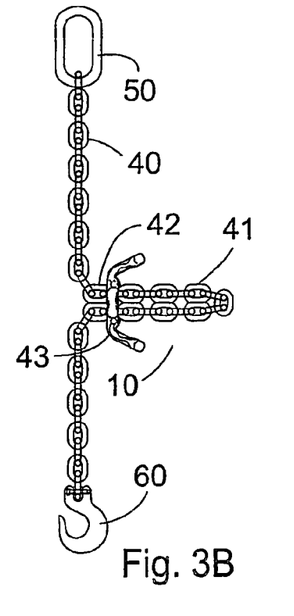
Figure 3C:
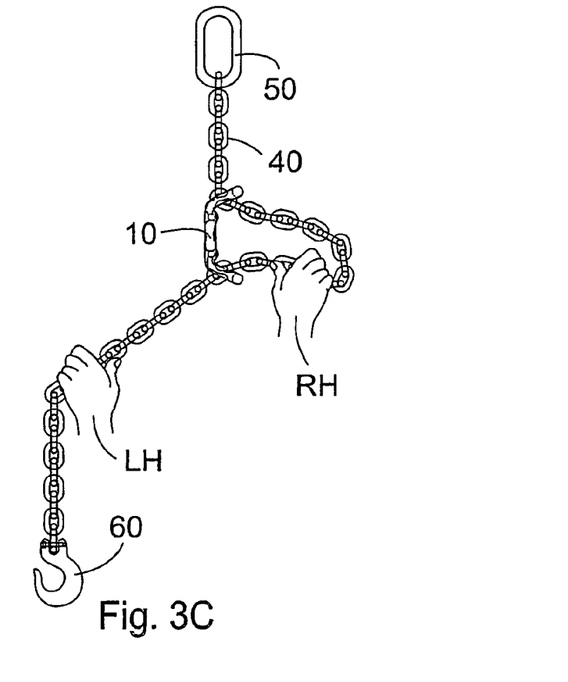
Figure 3D:
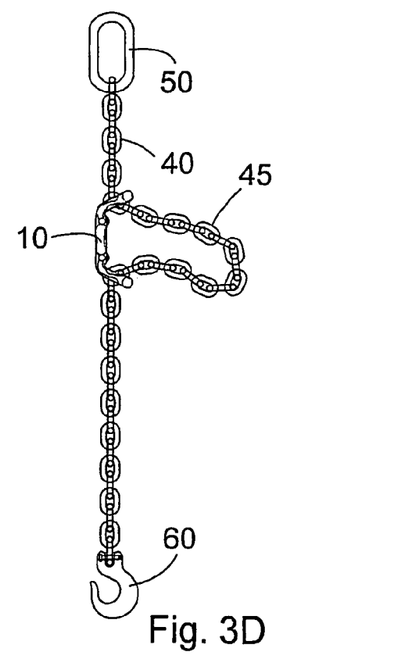
Figure 3E:
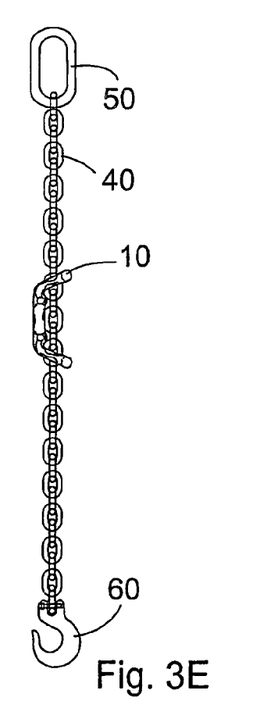
Figure 3F:
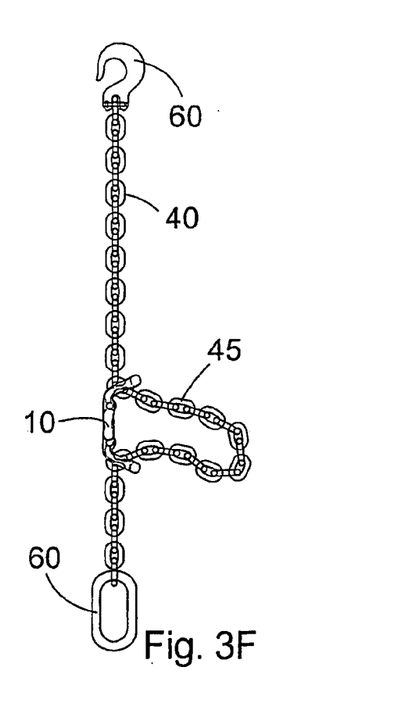

It will be apparent that the chain unit 40 can be adjusted to any desired effective length, by an operation similar to the one illustrated in FIGS. 3B, 3C and 3D. This also includes the possibility of letting the chain unit 40 form a totally straight line, as shown in FIG. 3E and corresponding to the configuration illustrated in FIGS. 1A and 1B.

The elongated body 10 should be dimensioned not only to conform to the material thickness d and outer width w of each chain link L1, L2, etc. but also to the inner length p of each chain link of the associated chain, so that an odd number of links (e.g. the links L3, L4 and L5) can be positioned along a straight line D between the first and second pocket-like configurations accommodating the selected links L2,L6. Preferably, the length L between the seating surfaces A and B facing each other at the longitudinal axis D should be approximately:

$$L = n \times p + q$$

where n is an odd integer >0
p is the inner length of each chain link,
0<q<3.5d, and
d is the material thickness of each chain link.

Preferably, the distance q=2.2d as shown in FIGS. 1A and 1B. However, the distance q could be slightly longer, up to 3d, or shorter than shown down to 2d. With such dimensional limits of the shortening device, it is possible to let the chain links take the full load without transferring any part of the load to the shortening device when the chain is arranged as a straight chain portion along the longitudinal axis D while still being coupled to the shortening device (as shown in FIGS. 1A, 1B and 3E. Furthermore, the limit q=2d is a necessity for n=1. Hereby, it is possible to use the chain to its full strength (although only at full length) without having to detach the shortening device from the chain.

Figure 4:
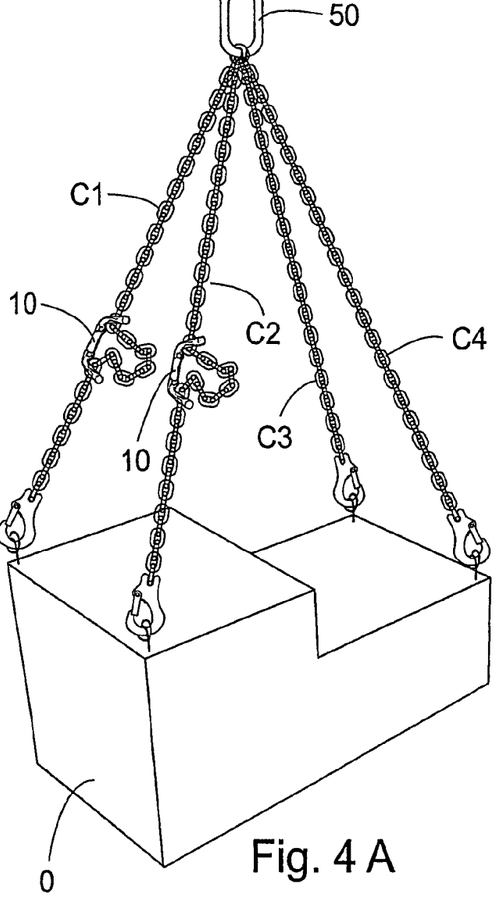
FIGS. 4A and 4B show, in schematic perspective views, how the shortening device can be used together with four chain portions for lifting an object.

FIGS. 4A and 4B illustrate how the chain shortening device 10 can be used when lifting a box-like object O by means of four chain portions C1, C2, C3 and C4 connected at the top to a master link 50 and at the bottom to four corners of the object O. Two of the chain portions, C1 and C2, are provided with chain shortening devices. By adjusting the effective lengths of these chain portions, it is possible to balance the orientation of the object, even if the corner points are located differently for different objects, as illustrated in FIGS. 4A and 4B. In case, there are only two or three chain portions connected to a master link 50, it is generally sufficient to adjust the length of only one chain portion, in particular by means of the attachable and detachable chain shortening device according to the invention. It is possible to attach one or more chain shortening devices without detaching the chain portions from the master link or from the load.

Figure 2A:
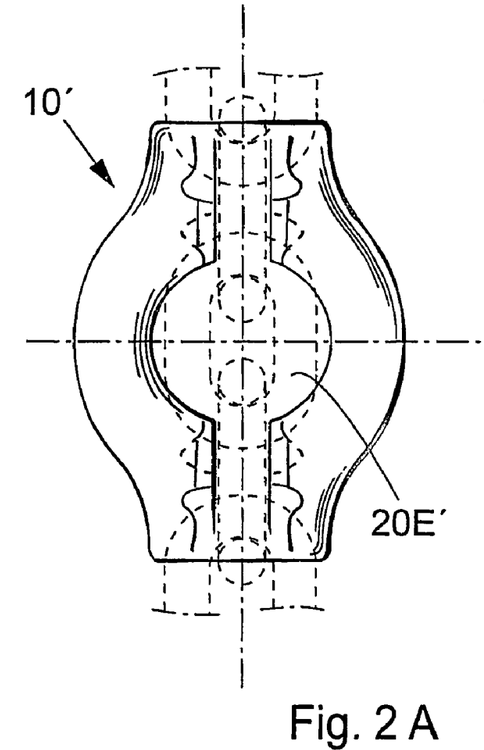
FIGS. 2A and 2B show, in views corresponding to FIGS. 1A and 1B, a second embodiment of the shortening device.
Figure 2B:
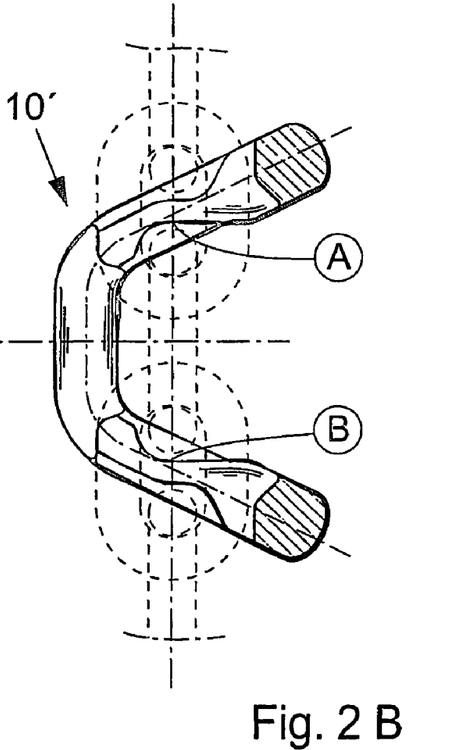

A second embodiment of the chain shortening device is shown in FIGS. 2A and 2B. The elongated body 10' is shorter and has no retainer members. Its length between the opposite seating surfaces A and B is slightly longer to one link (n=1 in the above formula). Also, the central lead-through opening 20E' is somewhat shorter as compared to FIGS. 1A and 1B. Otherwise, this embodiment is substantially like the first embodiment.

Of course, it is also possible to have a longer body 10 than the first embodiment of FIGS. 1A and 1B. This first embodiment is very advantageous in terms of strength, relative low weight and easy manual handling. In this respect, it should be noted that the overall weight and strength is improved by the diverging free end portions as compared to an embodiment as disclosed in the above-mentioned German patent specification (with mutually parallel free end portions of the body).

Figure 9:
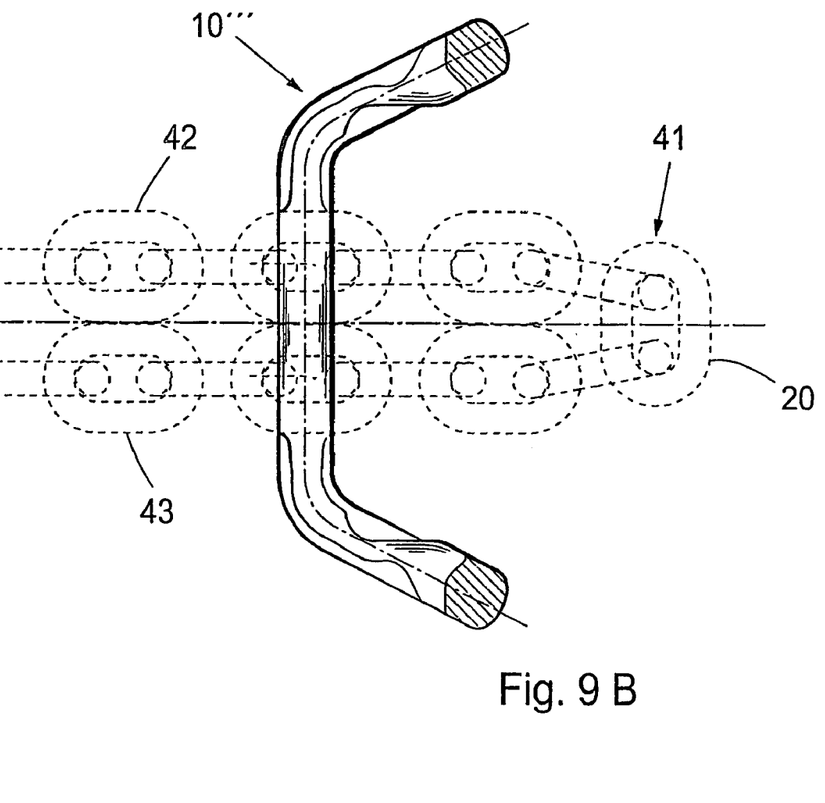
FIGS. 9A and 9B illustrate, in views corresponding to FIGS. 1A and 1B, a third embodiment of the shortening device.

A third embodiment of the chain shortening device is shown in FIGS. 9A and 9B. Here, the elongated lead-through opening 20'''E is provided with a waist portion 22 located in the mid portion of the elongated body 10'''. The waist portion 22 has a reduced width w''' which is smaller than the outer width w of the associated chain links. In this way, two apertures 20'''F and 20'''G are formed on each side of the waist portion 22, these two apertures 20'''F, 20'''G communicating with each other. Such an embodiment works very well. An end link L0 of a loop 41 of a chain can be threaded through the opening 20'''E in upright position. Thereupon, the parallel strands 42,43 of the loop 41 can be pulled through the respective apertures 20'''F, 20'''G. Because of the shape of the opening 20'''E, the two strands 42,43 are guided smoothly in the respective aperture 20'''F, 20'''G and prevents the strands from being twisted.

The invention claimed is:

1. A chain shortening device in combination with an associated chain consisting of oblong links having a material thickness d, an outer width w and an outer length 1 which is longer than said outer width w, said chain shortening device comprising:

a unitary elongated generally C-shaped body with a mid portion and two free end portions, and first and second slot portions located at the free end portions of the "C", each of said slot portions including a first and a second pocket-like configuration, respectively, for positioning selected links of said associated chain in a first and a second coupling position, respectively, and each of said first and second slot portions having, adjacent to said pocket-like configuration, a width which is wider than the material thickness d of said chain links but narrower than the outer width w of said chain links, and adjacent to a mid portion of said elongated body, a widened slot portion defining a respective one of two apertures, which are wide enough to permit threading said associated chain through said aperture, so that, upon coupling said associated chain to the shortening device with two selected links located in said first and second coupling positions, respectively, the chain links located between the two selected links will form either a straight chain portion, extending at the side of said mid portion of the elongated, generally C-shaped body, or a longer slack chain portion enabling the effective shortening of said associated chain, wherein said slot portions form parts of a central, single slot extending continuously and longitudinally between said first and second pocket-like configurations, and said central, single slat has a widened mid portion forming a central lead-through opening, which includes said two apertures and which is dimensioned to permit threading through a loop of said associated chain with two parallel strands, whereby the shortening device can be handled as a separate unit and be attached sideways to an existing, associated chain for the purpose of shortening the effective length thereof.

2. A combination as defined in claim 1, wherein said central lead-though opening is elongated in the longitudinal direction of said elongated body.

3. A combination as defined in claim 2, wherein the width of the slot portions adjacent to the central lead-though opening is only slightly wider than said material thickness d of the links of the associated chain, so as to prevent coupling of the shortening device to a chain consisting of links being stronger than those of the associated chain, and the length of central lead-through opening is such as to permit threading through a loop of an associated chain with the links of the two parallel strands of the loop being positioned next to each other in the longitudinal direction of the elongated body.

4. A combination as defined in claim 3, wherein said central lead-through opening is wider than said outer width w of the links of said associated chain and longer than 1.5 times that width w.

5. A combination as defined in claim 1, wherein said central lead-through opening has, at said mid portion of said elongated body, a waist portion with a reduced width, which is less than the outer width w of said chain links but greater than the material thickness d of said chain links, said waist defining said two apertures on opposite sides thereof so as to permit threading through a central portion of an upright link forming the leading end of said loop of said chain through said waist portion and threading though the adjoining parallel strands through said two apertures.

6. A combination as defined in claim 5, wherein each of said apertures are wider than said outer width w of said chain links but shorter, in the longitudinal direction of said elongated body, than said outer width w.

7. A combination as defined in claim 1, wherein retainer members are located in each of said first and second slot portions so as to selectively retain said first and second selected links adjacent to said first and second coupling positions.

8. A combination as defined in claim 1, wherein said free end portions of said elongated body are directed obliquely away from each other.

9. A combination as defined in claim 1, wherein seating surfaces, which form parts of said pocket-like configurations and face towards each other, are located at a mutual distance L from each other, said distance L being $$L = n \times p + q$$

where
  n is an odd integer>0
  p is the inner length of each chain link of the associated chain,
  $0 < q < 3.5d$
  d is the material thickness of each chain link.

10. A combination as defined in claim 9, wherein $2d < q < 3d$.

* * * * *